(12) United States Patent
Holohan

(10) Patent No.: US 11,703,175 B2
(45) Date of Patent: Jul. 18, 2023

(54) MECHANICAL PIG PUSHER

(71) Applicant: Casey Holohan, Kankakee, IL (US)

(72) Inventor: Casey Holohan, Kankakee, IL (US)

( * ) Notice: Subject to any disclaimer, the term of this patent is extended or adjusted under 35 U.S.C. 154(b) by 371 days.

(21) Appl. No.: 17/136,530

(22) Filed: Dec. 29, 2020

(65) Prior Publication Data
US 2022/0205579 A1     Jun. 30, 2022

(51) Int. Cl.
*F16L 55/46*     (2006.01)
*B08B 9/043*     (2006.01)
*E02F 3/96*     (2006.01)

(52) U.S. Cl.
CPC .............. *F16L 55/46* (2013.01); *B08B 9/043* (2013.01); *E02F 3/963* (2013.01)

(58) Field of Classification Search
CPC ....... F16L 55/46; F16L 55/30; F16L 2101/00; F16L 1/06; B08B 9/04; B08B 9/043; E21B 19/00; E02F 3/963; E02F 3/966; E02F 3/967
See application file for complete search history.

(56) References Cited

U.S. PATENT DOCUMENTS

| | | | | |
|---|---|---|---|---|
| 3,091,159 | A * | 5/1963 | Miller ..................... | E02F 3/967 173/184 |
| 5,208,937 | A * | 5/1993 | Cooper ................... | B08B 9/055 15/104.062 |
| 6,533,032 | B1 | 3/2003 | Seixas et al. | |
| 6,925,671 | B1 | 8/2005 | Mouton | |
| 7,536,742 | B2 * | 5/2009 | Schlosser ............. | B08B 9/0557 15/104.062 |
| 9,562,625 | B2 | 2/2017 | Fretwell | |
| 9,816,659 | B1 * | 11/2017 | Osborne ................. | F16L 55/46 |
| 9,989,186 | B2 * | 6/2018 | Anderson ............... | F16L 55/46 |
| 11,156,321 | B2 * | 10/2021 | Peterson ................ | F16L 55/46 |

FOREIGN PATENT DOCUMENTS

| EP | 3348887 A1 * | 7/2018 | ............... F16L 1/09 |
|---|---|---|---|
| GB | 2540618 A * | 1/2017 | ............... F16L 1/06 |

OTHER PUBLICATIONS

Conquip Engineering Group, "User Guide: Excavator Pipe Pusher", 2020. (Year: 2020).*

* cited by examiner

*Primary Examiner* — Laura C Guidotti

(57) ABSTRACT

A mechanical device that is used to prevent injury to workers that are handling pigs during launch insertion into a pipe. The mechanical device is attached to a large piece of construction equipment so that workers do not have to handle the pig.

5 Claims, 4 Drawing Sheets

MECHANICAL PIG PUSHER

BACKGROUND OF THE INVENTION

In pipeline transportation, pigging is the practice of using pipeline inspection gauges, devices generally referred to as pigs or scrapers, to perform various maintenance operations. This can be carried out without stopping the flow of the product in the pipeline. These operations include, but are not limited, to cleaning and inspecting the pipeline. This is accomplished by inserting the pig into a "pig launcher" (launching station) which is an oversized section in the pipeline, eventually reducing to a normal diameter. The launching station is then closed and the pressure-drive flow of the product in the pipeline is used to push the pig along down the pipe until it reaches the receiving trap, (a pig catcher or receiving station). Sometimes, gases such as carbon dioxide or nitrogen are used for this purpose.

Pigs are also used when new lines are installed and are pressure tested with water. The pigs are used to push the water out before the line can be dried and put into service.

Large scale, for example 24 inch diameter or larger pigs, used for cleaning have plastic or rubber disks sealing the perimeter against the inside of the pipe to propel the device and to remove loose sedimentation or scale buildup. Magnets can be used to attract and remove any loose metal objects in the pipe.

Pigging systems are designed so that the pig is loaded into the launcher, which is pressured to launch the pig into the pipeline through a kicker line.

There are many reports of incidents in which operators have been injured or even killed while performing a pigging operation. Common causes of such events are opening of the closure door while the vessel is still pressurized; opening of the main process valve while the closure door is not fully closed, opening of the closure door while a high concentration of $H_2S$ or other toxins remain inside the vessel, the vent valve remaining open while the vessel is being pressurized with its medium, and human handlers having injured muscles or backs due to handling a pig while putting the pig into the launcher.

This invention deals with the injury to workers that are handling the pig during launch insertion.

Pig handling varies from small (hand-held high tech instrumentation) to large (24 inch diameter or larger) pigs. This invention deals with the large variety. Such pigs are handled for insertion by several persons at a time and even with the aid of lifts or cranes, the handling is dangerous. This invention deals with a mechanical pig pusher which prevents the use of persons actually handling the pig.

Pig related prior art consists of U.S. Pat. No. 6,533,032, that issued Mar. 18, 2003 to Seixas et. al. that deals with storing pipeline pigs and launching the pigs into a subsea oil or gas production pipeline.

A second publication relating to pig launchers is U.S. Pat. No. 6,925,671, that issued on Aug. 9, 2005 to Mouton in which there is disclosed a pig launcher that deals with concrete pigs which weigh 400 pounds or more. The pig launcher uses a means for propelling the pig that includes a spool rotatably mounted. There is a pair of cables connected to the spool that engage the ends of a cantilevered arm setup for propelling the pig using cables that are attached to the end of the pipeline.

U.S. Pat. No. 9,562,625 that issued Feb. 7, 2017 to International Pipeline Products Limited deals with a method of launching a pig by locating a pipeline pig in a pig deployment device, releasably coupling a pig insertion member of the pig deployment device to the pig, releasably coupling the pig deployment device to one of the severed ends, operating the pig deployment device to cause the pig insertion member o translate the pig out of the deployment device and into the pipeline through a severed end of the pipe line, releasing the pig insertion member from the pig and retracting the pig insertion member leaving the pig in place within the pipeline, releasing the pig deployment device from the severed end, and welding the severed ends of the pipeline together. The deployment device consists of an elongated rod.

None of these references disclose or make obvious the device of the instant invention.

THE INVENTION

Thus, what is disclosed and claimed herein is a mechanical pig pusher. The mechanical pig pusher comprises a metal backer support plate, the metal backer support plate has at least four through openings in it and a front surface. There is a metal top support plate, the metal top support plate has a plurality of through openings on a leading edge, the metal top support plate being rigidly fixed to the front surface of the metal backer support plate.

There is a metal bottom support plate, the metal bottom support plate has a plurality of through openings on a leading edge, the metal bottom support plate being rigidly fixed to the front surface of the metal backer support a predetermined distance apart and parallel with said metal top support plate. The through openings in the metal top support plate and the metal bottom support plate are vertically aligned with each other.

There is an adapter insertable between the metal top support plate and the metal bottom support plate. The adapter has at least two vertical through holes to receive keeper pins. The adapter has a metal end cap flange at a back end and a metal plate cap at a front end and the metal end cap flange and the metal plate cap have a plurality of through openings along an outside edge.

One keeper pin insertable in any of the vertically aligned through holes and a second keeper pin insertable in additional through holes centered in the metal top support plate and metal bottom support plate, both keeper pins being additionally inserted through openings in the adapter.

It is contemplated within the scope of this invention to use one or more extensions to the adapter. The extensions are removably attachable to the metal plate cap. The extensions are an elongated shaft having two ends and a flange on both ends, there being a plurality of through openings in the flange at the ends for receiving bolts for attachment to the adapter. It is also contemplated within the scope of this invention to utilize more than one extension on the mechanical pig pusher of this invention.

DETAILED DESCRIPTION OF THE INVENTION

Figure 1:
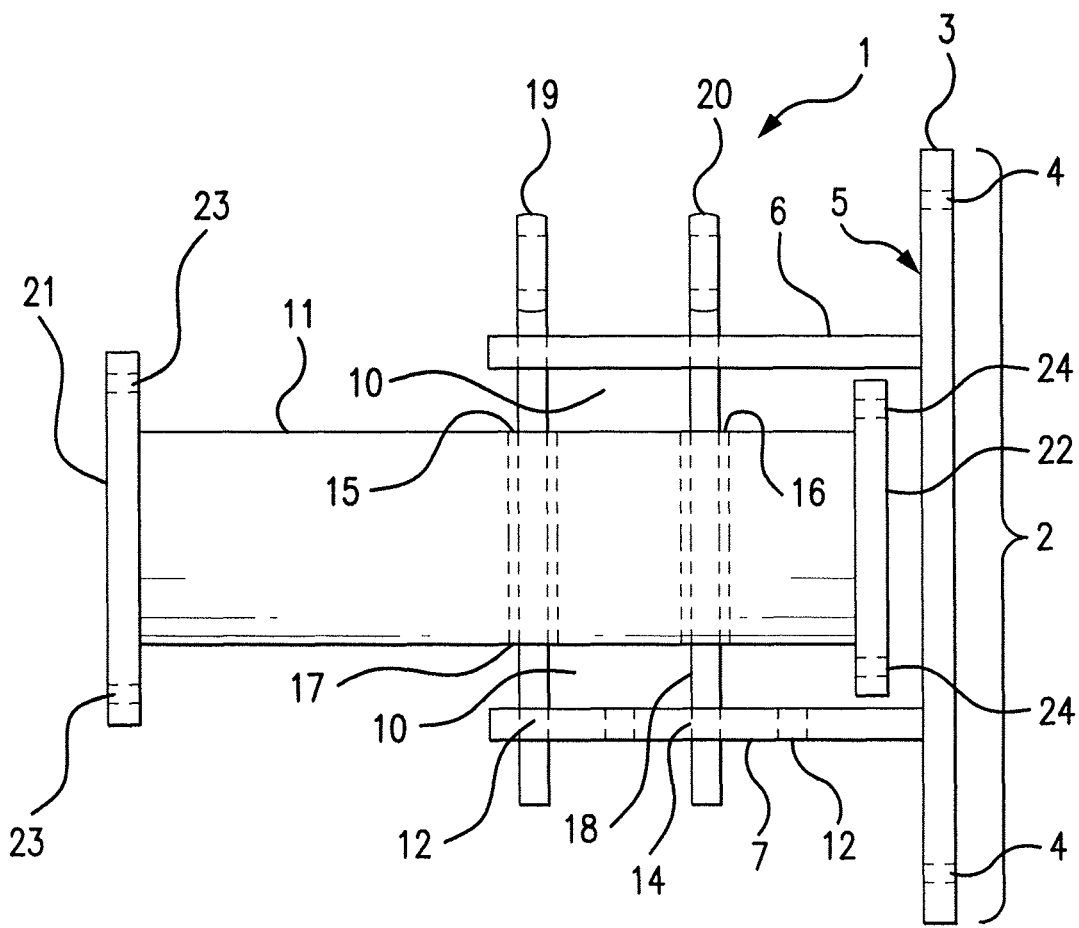
FIG. 1 is a full side view of a mechanical pig pusher of this invention.

Shown in FIG. 1 is a full side view of a mechanical pig pusher 1 of this invention. There is shown a metal support holder 2 consisting of a metal backer support plate 3. The metal backer support plate 3 has at least four through openings 4 through it (shown in phantom), generally at or near the corners. The metal backer support plate 3 has a front surface 5.

Attached to the front surface 5 of the metal backer support plate 3 are two support plates (See FIG. 1), a top support plate 6 and a bottom support plate 7. The plates 6 and 7 are firmly attached to the metal backer support plate 3, usually by welding, although other means can be used as long as the plates 6 and 7 remain parallel and aligned to each other and will not break away. The metal top support plate 6 has a plurality of through openings 8 on a leading edge 9 and a center opening 13. The openings 8 and the opening 13 (FIG. 2), in conjunction with the metal bottom support plate 7 openings 12 and 14 (FIG. 1) accommodate pins 19 and 20 which hold an adapter 11 in place between plates 6 and 7.

The metal bottom support plate 7 has a plurality of through openings 12 as indicated just Supra. These openings 12 are in vertical alignment with the openings 8 in the metal top support plate 6.

The metal top support 6 and the bottom support plate 7 are arranged on the front surface 5 of the metal backer support plate 3 such that the gap 10 between them will accommodate the adapter 11 located therein.

The adapter 11 has two openings, opening 15 in alignment with the openings 8 and 12 and opening 16 in alignment with the centered openings 13 and 14. In addition, the adapter 11 has openings in the bottom, an opening 17 that aligns with the openings 8 and 12 and an opening 18 that aligns with the center openings 13 and 14.

The adapter 11 has a front metal plate cap 21 and a metal end cap flange 22 at the back end. Both the front metal plate cap 21 and the metal end cap flange 22 have openings 23 and 24 all shown in phantom in FIG. 1, respectively, through them. The adapter 11 is held in place by two pins 19 and 20, 19 being the front or leading edge pin and 20 being the centered opening pin. This pins 19 and 20 are not fastened in the openings and can be inserted and withdrawn at will.

Figure 2:
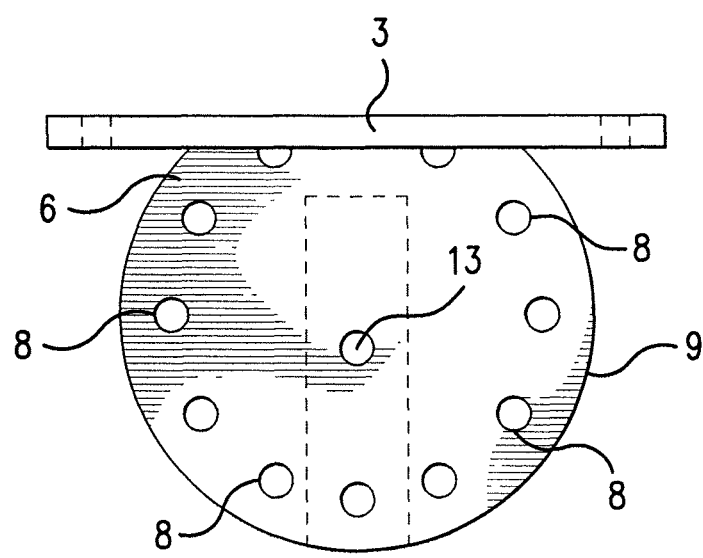
FIG. 2 is a full top view is a full top view of the metal support holder for the mechanical pig pusher of this invention.
Figure 7:
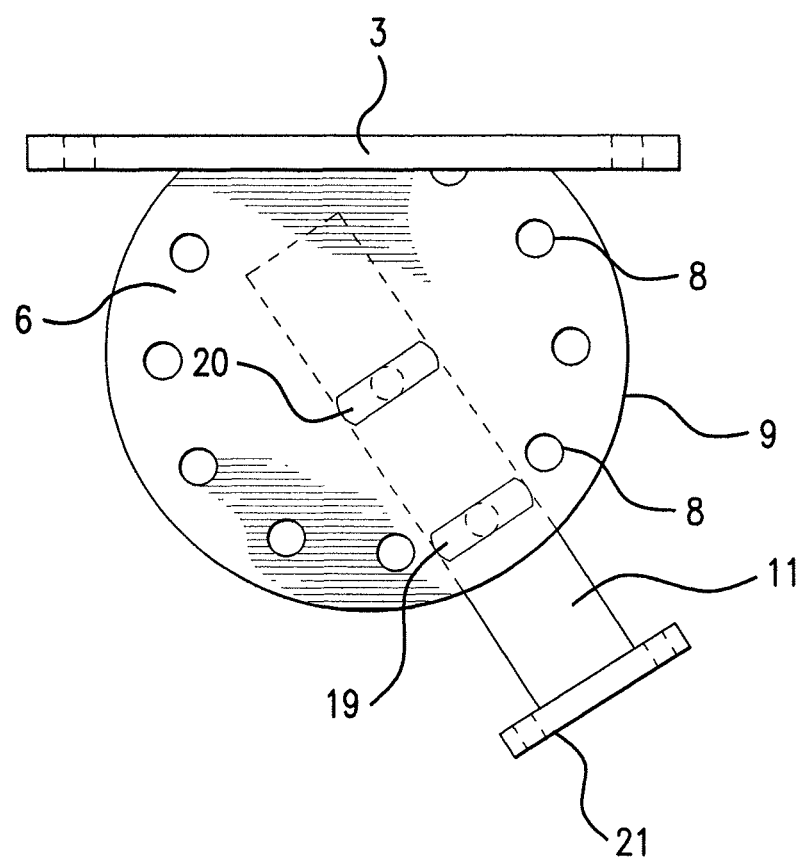
FIG. 7 is an illustration of the mechanical pig pusher of this invention at an angle.

FIG. 2 shows a full top view of the metal backer support plate 3, and the metal top plate 6 showing the openings 8 and the centered opening 13. The adapter 11 can be swiveled between the top plate 6 and the bottom plate 7 by removing the pin 19. When the desired angle is achieved, the pin 19 is then re-inserted into the appropriate openings to secure the adapter 11 in place (see FIG. 7).

Figure 3:
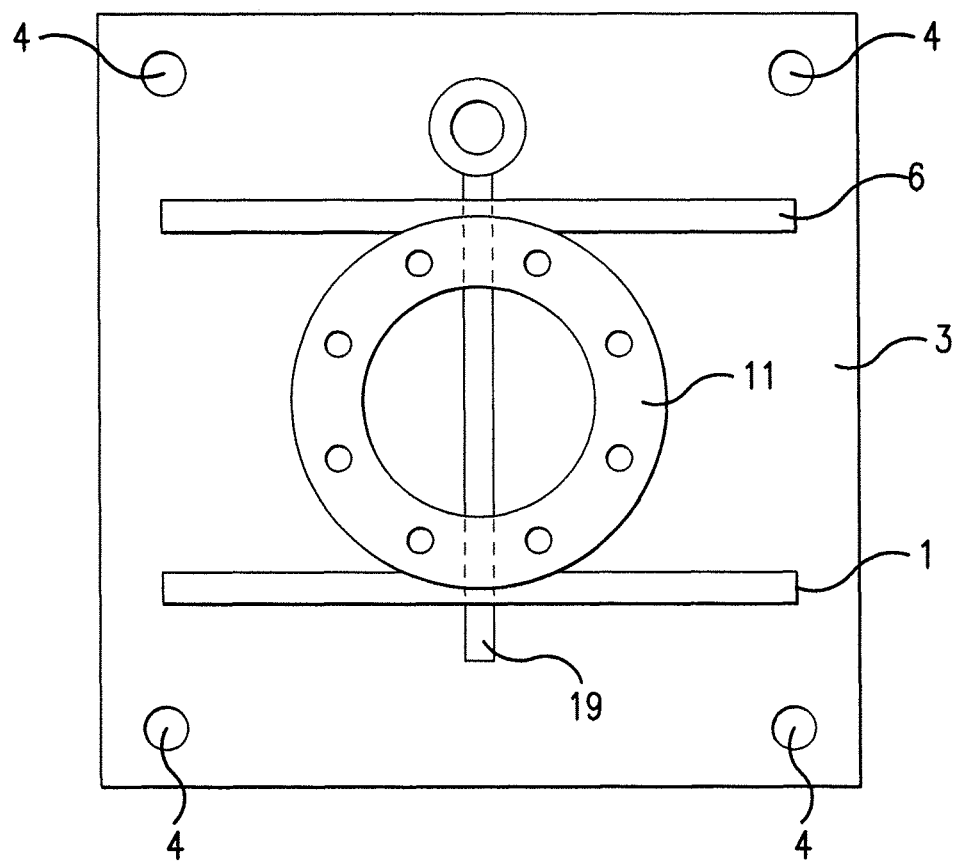
FIG. 3 is full front view of the mechanical pig pusher of this invention.

FIG. 3 is a full front view of the mechanical pig pusher showing the metal backer plate 3, the top plate 6, the bottom plate 7, the adapter 11, pin 19, and openings that are used to affix the device to a piece of heavy equipment. Pins used in the inventive device range from about inch to about 1 inch, depending on the size of the device. A larger device needs a larger pin.

Figure 4:
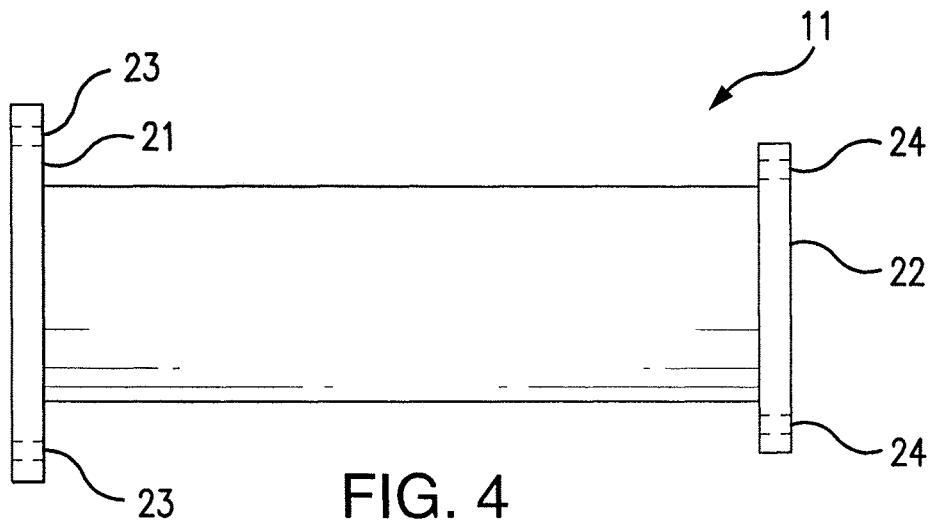
FIG. 4 a full side view of an adapter for the mechanical pip pusher of this invention.

FIG. 4 is a full side view of the adapter 11 showing the front metal plate cap 21 and the metal end cap flange 22 with openings 23 and 24 shown in phantom.

Figure 5:
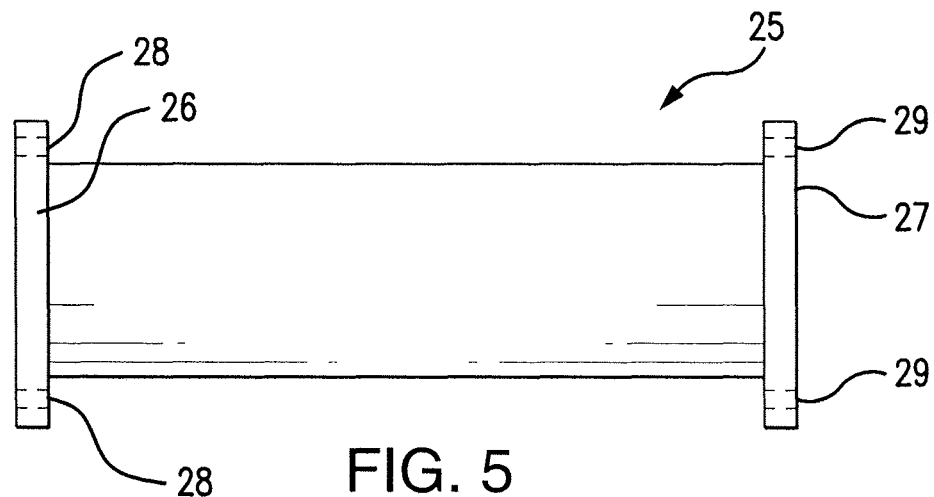
FIG. 5 is a full side view of an extension for the mechanical pig pusher of this invention.

FIG. 5 is a full side view of an extension 25 showing flanges 26 and 27 at the ends. These flanges 26 and 27 are adapted with openings 28 and 29 (shown in phantom) to allow attachment to the adapter 11. These flanges are typically used in piping. Two are used to join pieces together or to stop product from leaking out of a pipe that has flange openings. A rating in pounds (lbs), for example, 300 lbs, is a pressure rating. The instant device is useful on pipes having a 4 inch diameter and larger. Some pipes have a diameter of 36 inches.

Figure 6:
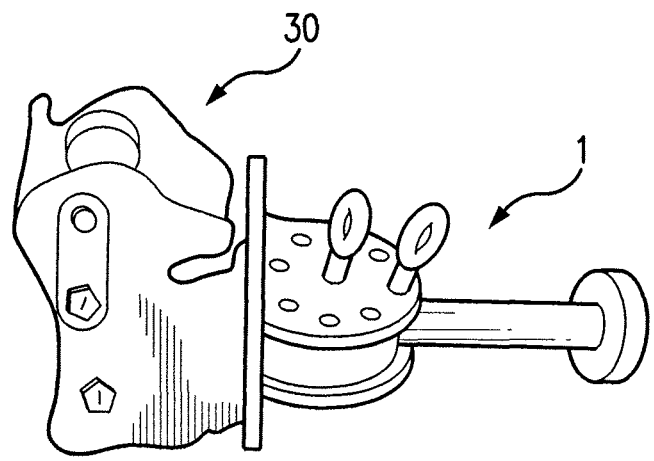
FIG. 6 is a view in perspective of a mechanical pig pusher of this invention attached to the shovel of a piece of heavy equipment (equipment not shown).

FIG. 6 is a view in perspective of the device 1 of this invention affixed to a shovel 30 of a piece of heavy equipment. The heavy equipment is not shown and is not part of the instant invention.

In use, the mechanical pig pusher 1 of this invention is attached to the heavy equipment. The pig is lifted mechanically by a piece of equipment which aligns the pig with the opening in the pig launcher and the mechanical pig pusher is aligned behind the pig and pushes the pig into the launcher.

In this manner, all of the heavy lifting and all of the potential problems that arise in loading a pig into a launcher are avoided.

The mechanical pig pusher of this invention is designed to fit on any large piece of equipment. Such equipment includes such things as bulldozers, excavators, skid steers, tractors, and the like.

The devices of this invention are manufactured from heavy metal such as iron and steel and are attachable to the large equipment by any means that is convenient and that will hold the device.

What is claimed is:

1. A mechanical pig pusher, said mechanical pig pusher comprising a metal support holder consisting of:
   A. a metal backer support plate, said metal backer support plate having at least four through openings therein and a front surface;
   B. a metal top support plate, said metal top support plate having a plurality of through openings on a leading edge thereof, said metal top support plate being rigidly fixed to said front surface of said metal backer support plate;
   C. a metal bottom support plate, said metal bottom support plate having a plurality of through openings on a leading edge thereof, said metal bottom support plate being rigidly fixed to said front surface of said metal backer support a predetermined distance apart and parallel with said metal top support plate, said through openings in said metal top support plate and said metal bottom support plate being vertically aligned with each other;
   D. an adapter, insertable between said metal top support plate and said metal bottom support plate, said adapter having at least two vertical through holes to receive keeper pins, said adapter having a metal end cap flange at a back end and a metal plate cap at a front end, said metal end cap flange and said metal plate cap have a plurality of through openings along an outside edge;
   E. one said keeper pin insertable in any of said vertically aligned through holes, a second said keeper pin insertable in additional through holes centered in said metal top support plate and metal bottom support plate, both said keeper pins being additionally inserted through openings in said adapter.

2. The mechanical pig pusher as claimed in claim 1 wherein an extension is removably attached to said metal plate cap, wherein said extension is an elongated shaft having two ends and a flange on both said ends, there being a plurality of through openings in said ends for receiving bolts for attachment to said adapter.

3. The mechanical pig pusher as claimed in claim 2 wherein the mechanical pig pusher is manufactured from metal.

4. The mechanic pig pusher as claimed in claim 3 wherein the metal is iron.

5. The mechanical pig pusher as claimed in claim 3 wherein the metal is steel.

* * * * *